INVENTORS
CLARENCE A. DEHNE
ROBERT J. ROLAND

BY
Farley, Forster & Farley
ATTORNEYS

Jan. 7, 1969  C. A. DEHNE ET AL  3,420,188
DOG POSITIONING MECHANISM FOR CONVEYOR CARRIERS
Filed Feb. 14, 1966  Sheet 2 of 2
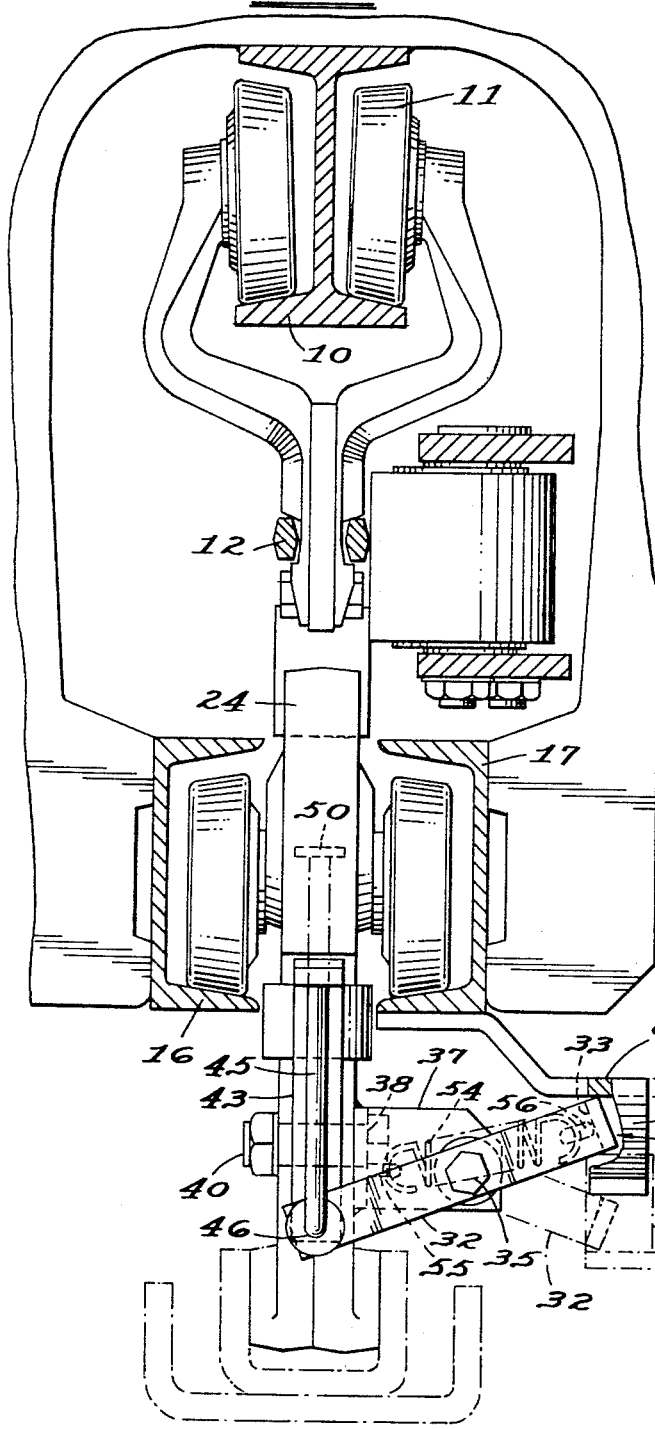
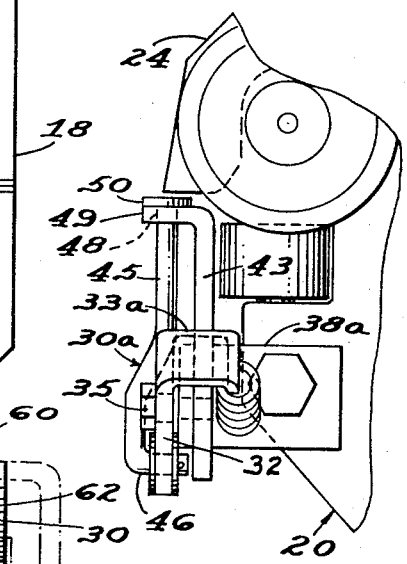
INVENTORS
CLARENCE A. DEHNE
ROBERT J. ROLAND
BY
Farley, Forster & Farley
ATTORNEYS United States Patent Office 3,420,188
Patented Jan. 7, 1969

3,420,188
DOG POSITIONING MECHANISM FOR CONVEYOR CARRIERS
Clarence A. Dehne, Orchard Lake, Mich., and Robert J. Roland, Cincinnati, Ohio, assignors to Jervis B. Webb Company, a corporation of Michigan
Filed Feb. 14, 1966, Ser. No. 527,173
U.S. Cl. 104—172                9 Claims
Int. Cl. B61b 13/04; B61c 11/02

ABSTRACT OF THE DISCLOSURE

A power and free conveyor carrier having driving and holdback dogs movable between operative and inoperative positions relative to a pusher of a propelling member, in which mechanism is provided on the carrier enabling at least one of the dogs to be moved from one position to the other and retained therein, the mechanism being operable manually or by a trackside cam.

---

This invention relates to carriers of power and free conveyors which are propelled along a supporting track by engagement between a dog on the carrier and a pusher on a driven propelling member travelling adjacent the carrier supporting track, and provides an improved construction for selectively positioning a dog in operative or inoperative relation relative to a pusher.

A conveyor carrier of the type under consideration is conventionally equipped with a driving dog and with a holdback dog adjacent the driving dog for trapping a pusher between the two dogs; in some installations carriers are additionally equipped with a supplementary driving dog to enable the carrier to be transferred between a forwarding propelling member and a receiving propelling member.

The principal object of the present invention is to provide a simple mechanism which can be mounted on the carrier for selectively positioning any dog or any combination of dogs on the carrier in operative or inoperative relation with respect to a pusher; and which mechanism may be operated manually, or optionally automatically by cam means mounted alongside the path of carrier movement.

In some instances it may be desirable to disable or render all dogs on a carrier inoperative, such as to move the carrier by means other than a pusher along some portion of a system. Under other conditions it may be desirable to disable only a certain dog or dogs. For example, the carrier may be stopped at any location by disabling the driving dog and supplementary driving dog if equipped therewith; the carrier may be transferred to a pusher of a slower moving receiving propelling member by disabling the holdback dog in order to prevent an interference condition; or, a supplementary driving dog may be disabled in order to prevent pusher interference therewith in traversing curves. These examples merely illustrate some of the possible conditions under which it is desirable to make a dog on a carrier selectively operable or inoperable along some portion of a power and free system.

According to the invention, a conveyor carrier of the type having at least one dog mounted thereon for movement between an operative position in which it is engageable by a pusher of a propelling member and an inoperative position in which it is not so engageable, is characterized by mechanism on the carrier for selectively moving the dog between said positions comprising a lever, means pivotally supporting the lever on the carrier, dog actuating means associated with the lever whereby the dog will be moved when the lever is pivoted between a first setting of the lever to a second setting thereof, and means for releasably retaining the lever in the position to which it is pivoted.

This mechanism may be employed with a driving dog which may be either a main driving dog or a supplemental driving dog, with a holdback dog, or with both driving and holdback dogs. Further, the lever may be moved manually, or by cam means mounted alongside the path of carrier movement for engagement by a portion of the lever, the lever being selectively movable between the first and second settings thereof in response to such engagement.

Other features and advantages of the invention will appear from the following description of the representative embodiment thereof disclosed in the accompanying drawings in which:

FIGURE 2 is an end elevation of the structure shown in FIG. 1; and

FIGURE 3 is a fragmentary side elevation illustrating a modification of the mechanism used in conjunction with one dog.

Figure 1:
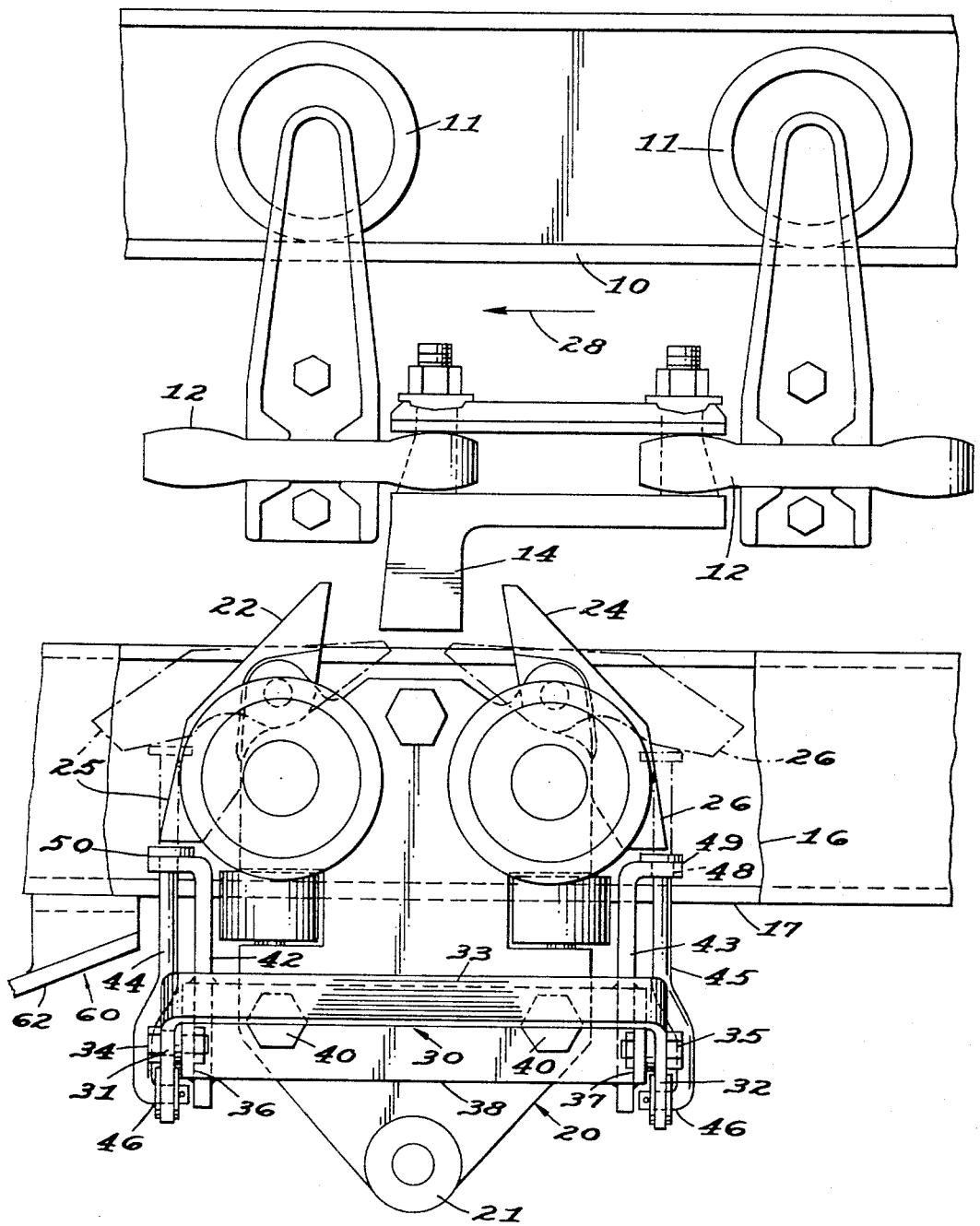
FIGURE 1 is a side elevation of a portion of a power and free conveyor showing a carrier equipped with driving and holdback dogs and the dog positioning mechanism of the invention.

In FIGS. 1 and 2, an upper I-beam track member 10 supports trolleys 11 which in turn support an endless propelling member in the form of the chain 12 equipped at spaced intervals with depending pushers 14. The channel section rails 16 and 17 of a carrier supporting track are mounted in fixed relation to the upper track 10 by track hanger yokes 18.

A representative wheeled carrier 20 is shown on the carrier supporting track, and includes a lower portion 21 from which a load may be suspended. The carrier is equipped with pivotally mounted one-way driving and holdback dogs 22 and 24, the dogs having counterweighted tail portions 25 and 26 respectively which normally urge the dogs to an extended operative position for engagement by a pusher 14 which travels in the direction of the arrow 28, the chain 12 being driven by a conventional type of drive unit, not shown. When a pusher 14 overtakes the carrier 20, the holdback dog 24 will first be engaged and will pivot to an inoperative position such as indicated in broken line in FIG. 1, allowing the pusher 14 to pass on into engagement with the driving dog 22. Should a carrier overtake a pusher, the driving dog 22 will first engage the pusher and pivot to inoperative position, permitting the carrier to pass on and the pusher to be engaged by the holdback dog 24. In either event the pusher 14 becomes trapped between the driving dog 22 and holdback dog 24.

Mechanism is provided on the carrier for selectively moving both the driving and holdback dogs 22 and 24 to an inoperative position with respect to the pusher 14 and retaining the dogs therein. This mechanism comprises a U-shaped lever having portions 31 and 32 extending transversely of the carrier and a base portion 33 extending longitudinally thereof, the transverse portions 31 and 32 each being connected by pivot bolts 34 and 35 to the arms 36 and 37 of a U-shaped bracket 38, the bracket 38 being secured to the carrier body by bolts 40.

A pair of upstanding L-shaped members 42 and 43 are also secured to the bracket 38 and serve as guides for dog actuating means associated with the lever 30. The dog actuating means shown comprises a pair of rods 44 and 45, each rod having a lower end portion 46 pivotally connected to the lever 30 and extending slidably through a hole 48 in the upper portion 49 of one of the guides 42 and 43, the rods each being provided with an enlarged upper end 50 which abuts against the upper surface of the guide in one pivotal setting of the lever 30.

The lever may be pivoted from the setting shown in full line in FIG. 2 to the second setting indicated in broken line, this movement producing upward movement of the actuating rods 44 and 45 into abutting engagement with the tail portions 25 and 26 of the driving and holdback dogs 22 and 24, and moving the dogs to their other inoperative position indicated in broken line, which position also defines the limit of pivotal movement of the lever 30 and the second setting thereof.

Releasable means are provided for retaining the lever in either setting to which it is moved and consisting simply in a tension spring 54 mounted between an ear 55 on the bracket 38 and an ear 56 on the lever 30 so as to extend in overcenter relation to the axis of pivotal movement of the lever defined by the bolts 34 and 35.

The lever may obviously be moved from one setting to the other manually. It may also be moved to either setting by a suitable cam mounted on the carrier supporting track so as to be engaged by the extending base portion 33 of the lever. Such a cam 60 is shown in full line in FIGS. 1 and 2, having a downwardly inclined camming surface 62 for causing movement of the lever from the first or full line setting thereof to the second setting thereof in response to engagement between the cam and the portion 33 of the lever of a forwardly moving carrier. A similar cam 64 is indicated in FIG. 2, but provided with an upwardly inclined cam surface 66 for producing pivotal movement of the lever in the opposite direction.

FIG. 3 shows that the same basic construction may be used for selectively moving only one dog of a carrier from one position to the other, either the driving dog, holdback dog or supplementary driving dog, as desired. This construction is essentially the same as that previously described and the same reference numerals have been used as employed on the holdback dog portion of the mechanism of FIGS. 1 and 2, except that the bracket 38a may be shortened together with the longitudinaly extending portion 33a of the lever.

By suitably mounting the cams 60 and 64 along the carrier track, a lever 30 or 30a can be tripped from one setting to another and will be releasably retained by the overcenter spring 54 in the setting to which it is tripped. Thus a dog of the carrier may be selectively positioned in either operative or inoperative relation to a pusher along any portion of the path of travel desired. Multiple dogs on a carrier can be individually positioned in operative or inoperative relation by mounting the mechanism for controlling the position of one dog on one side of the carrier and the mechanism for another dog on the opposite side of the carrier, with a cam on either side of the track for each mechanism. Alternately, the lever portion of the mechanism may be made of different lengths, or mounted at different heights so that the cam used to actuate the lever for positioning one dog will not be engageable by the lever for positioning another dog.

We claim:

1. A conveyor carrier of the type having at least one dog mounted thereon for movement between an operative position in which it is engageable by a pusher of a propelling member and an inoperative position in which it is not so engageable, characterized by mechanism on the carrier for selectively moving the dog between said positions comprising a lever, means pivotally supporting the lever on the carrier, dog actuating means associated with the lever whereby the dog will be moved from one of said positions to the other when the lever is pivoted between a first setting of the lever and a second setting thereof, and means for releasably retaining the lever in the position to which it is pivoted.

2. A conveyor carrier as claimed in claim 1 wherein the dog is a driving dog.

3. A conveyor carrier as claimed in claim 1 wherein the dog is a holdback dog.

4. A conveyor carrier as claimed in claim 1 wherein the means for releasably retaining the lever in said second setting includes an overcenter spring means for normally retaining the lever in the setting to which it is pivoted.

5. A conveyor carrier as claimed in claim 1 further including cam means mounted alongside the path of carrier movement for engagement by a portion of the lever, the lever being selectively movable between said first and second settings thereof in response to such engagement.

6. A conveyor carrier as claimed in claim 5 wherein the dog is a driving dog.

7. A conveyor carrier as claimed in claim 5 wherein the dog is a holdback dog.

8. A conveyor carrier as claimed in claim 1 wherein the carrier is equipped with both driving and holdback dogs, and wherein the dog actuating means associated with the lever moves both of said dogs.

9. A mechanism for selectively positioning a dog on a conveyor carrier which dog is mounted for movement between operative and inoperative positions relative to a pusher of a propelling member comprising a bracket and means for securing the bracket to the carrier, a lever pivotally secured to the bracket on an axis extending substantially parallel to the path of carrier movement and including a portion projecting to one side thereof, a dog actuating member pivotally secured to the inner end of the lever and having a portion slidably supported on the bracket, a dog engaging portion on the actuating member adapted to contact the carrier dog upon pivotal movement of the lever in at least one direction and move the dog from one position to another, cam means mounted adjacent the path of carrier travel and engageable by the projecting portion of the lever to pivotally move the lever from one setting to another, and resilient means mounted between the lever and the carrier for releasably retaining the lever in the setting to which it is moved.

References Cited

UNITED STATES PATENTS

| | | | |
|---|---|---|---|
| 2,595,813 | 5/1952 | Raney | 267—1 |
| 2,883,942 | 4/1959 | Johnson | 104—172 |
| 2,987,012 | 6/1961 | King | 104—172 |
| 3,196,805 | 7/1965 | Bishop | 104—178 |

ARTHUR L. LA POINT, *Primary Examiner.*

D. F. WORTH, *Assistant Examiner.*

U.S. Cl. X.R.

104—178